(12) United States Patent
Elgner et al.

(10) Patent No.: US 7,258,542 B2
(45) Date of Patent: Aug. 21, 2007

(54) MOLD ASSEMBLY FOR BLOW MOLDING PLASTIC ARTICLES AND METHOD OF USE

(75) Inventors: Roger Elgner, Woodbridge (CA); Changize Sadr, North York (CA)

(73) Assignee: Salflex Polymers Ltd., Weston, Ontario (CA)

( * ) Notice: Subject to any disclaimer, the term of this patent is extended or adjusted under 35 U.S.C. 154(b) by 323 days.

(21) Appl. No.: 11/006,623

(22) Filed: Dec. 8, 2004

(65) Prior Publication Data

US 2005/0084562 A1     Apr. 21, 2005

Related U.S. Application Data

(62) Division of application No. 10/071,251, filed on Feb. 11, 2002, now Pat. No. 6,841,118.

(51) Int. Cl.
*B29C 49/30* (2006.01)
*B29C 49/32* (2006.01)

(52) U.S. Cl. .................. 425/532; 425/540; 425/541

(58) Field of Classification Search ............. 425/532, 425/540, 541; *B29C 49/30, 49/32*
See application file for complete search history.

(56) References Cited

U.S. PATENT DOCUMENTS

| | | | |
|---|---|---|---|
| 3,809,521 A | 5/1974 | LaFosse | |
| 4,239,474 A | 12/1980 | Nakagawa | |
| 4,362,688 A | 12/1982 | Nakagawa | |
| 5,030,083 A | 7/1991 | Kohno et al. | |
| 5,264,178 A | 11/1993 | Yamamura et al. | |
| 5,464,635 A | * 11/1995 | Geiger | 425/532 |
| 5,601,779 A | 2/1997 | Ishikawa et al. | |
| 5,814,269 A | 9/1998 | Geiger | |
| 6,168,750 B1 | 1/2001 | Van Schaftingen et al. | |
| 6,416,313 B1 | 7/2002 | Dohmen et al. | |

FOREIGN PATENT DOCUMENTS

| | | | |
|---|---|---|---|
| JP | 03042228 | | 2/1991 |
| JP | 04364922 A | * | 12/1992 |
| JP | 08034072 A | * | 2/1996 |
| JP | 2002067132 A | * | 3/2002 |

* cited by examiner

*Primary Examiner*—Robert B. Davis
(74) *Attorney, Agent, or Firm*—Bereskin & Parr

(57) ABSTRACT

A mold assembly for blow molding plastic articles is provided having an upper mold member, a lower mold member and a lower support member. The lower mold member is preferably a relatively lightweight plate having a generally centrally located molding cavity matingly matched with an upper molding cavity in the upper mold member. The lower mold member is moved horizontally and optionally vertically beneath an extrusion head as a molten parison is extruded. The lower mold member is then transported to, and positioned within, the lower support member. The upper mold member is then closed over the lower mold member and lower support to close the mold assembly. The molten parison is then expanded in the mold cavity. After the molding operation, the plastic part may be removed and the lower mold member may be cooled by immersion in a cooling fluid. The apparatus to move the lower mold member during extrusion of the parison and to the molding station may be a robotic arm. The lower mold member is relatively lightweight so that it may be efficiently moved by the robot arm while the necessary structural support is provided by the lower support member.

10 Claims, 7 Drawing Sheets

MOLD ASSEMBLY FOR BLOW MOLDING PLASTIC ARTICLES AND METHOD OF USE

This application is a divisional of U.S. application Ser. No. 10/071,251 filed Feb. 11, 2002, now U.S. Pat. No. 6,841,118 issued Jan. 11, 2005.

FIELD OF THE INVENTION

This present invention relates to an apparatus and method for manufacturing blow-molded plastic articles, and particularly to manufacturing multi-axial blow-molded articles.

BACKGROUND OF THE INVENTION

It is well-known that blow molding is effective in fabricating hollow plastic articles. Many components such as plastic parts used in the automotive industry include portions which extend substantially in length, width and height. Examples of such components include tubular conduits such as air conditioning ducts, hoses and the like, which may have portions which are at angle to one another but which each have substantial length and width. These articles are referred to in this specification as multi-axial articles. Typically, when molding articles in a blow molding process, a parison is extended and the parison is accommodated in a suitable groove in one half of a blow mold, the more complex the shape of the article, the more complex will be the shape of the mold and the groove in the mold. For very simple articles, a parison may be extruded directly into a groove under the effect of gravity alone. With more complex shapes other steps are usually required to properly locate the parison before blowing occurs. Often instead of using molds which close horizontally, the mold halves are arranged to close in the vertical direction with the parison being placed into the groove of the lower mold.

The prior art offers several solutions for placing a molten parison in such molds. For example, one solution involves introducing means for horizontally (i.e. in an x-y plane) moving the lower mold half beneath the parison extrusion head in such a manner that the parison is dropped within the mold cavity. Molds used in blow molding are typically are quite heavy, however, and hence this solution requires significant effort to effectively and accurately move the lower mold half.

In some prior art devices, the extrusion head is moved horizontally in an x-y plane so that as the parison is extruded it drops into the groove in a lower mold half. Extrusion equipment used in typical blow molding is also large and heavy to support the extrusion temperatures and pressures involved and it is costly and cumbersome to move the extrusion head even in a horizontal plane.

U.S. Pat. No. 5,030,083 to Kohno teaches the use of a robotic hand to grasp and transport an extruded parison to a remote lower mold half, and place it therein. Where a sizeable parison is required, however, the swinging action of the parison induced by its movement by the robot hand can make the path the hand must follow to properly load the parison in the mold quite complex. Another significant problem is the weight and strength of the molten parison. The parison may break under its own weight during transport from the extrusion head to the mold.

U.S. Pat. No. 5,464,635 to Geiger discloses the use of a moveable pre-mold, having a shape matching the lower mold cavity. A molten parison is extruded into the pre-mold which is moved under the extrusion head, by robotic or other means, to cause the parison as it is extruded, to be deposited into the pre-mold cavity. Once loaded with the parison, the pre-mold is transported to the lower mold half and positioned thereover, with the pre-mold and mold cavities substantial aligned. The pre mold includes openable doors or other similar acting structure so that by opening the structure, the parison is dropped directly into the mold cavity of the lower mold half. This system requires the design of a complex premold with means to accurately release the parison so that it accurately falls into the groove of the lower mold half.

Accordingly, there is a need for an improved apparatus and method for the fabrication of multi-axial blow-molded plastic parts.

SUMMARY OF THE INVENTION

In accordance with the invention, a mold assembly for blow molding plastic articles comprises an upper mold member which has an upper molding cavity, a lower support member and a lower mold member which has a lower molding cavity. The molding assembly is particularly useful for creating multi-axial parts in which the molding cavity may have a complex shape. In such situations, it is advantageous to extrude the parison from an extrusion head so that the parison is received in the lower molding cavity as it is extruded. The lower molding cavity is shaped to cooperate with the upper molding cavity. The lower mold member includes means for being matingly receivable in and supportable by the lower support member. The lower mold member is movable from a position adjacent a parison extrusion head for receiving a parison in the lower mold cavity to a position where the lower mold member is received in the lower support member. The mold assembly is then closable with the lower mold member being positioned intermediate the upper mold member and the lower support member. The mold assembly when closed is capable of expanding a parison disposed within the mold assembly.

In a particularly preferred embodiment, the mold assembly includes a robot for moving the lower mold beneath the extrusion head to facilitate placing the extruded parison within the molding cavity of the lower mold member. The robot may also be used to translate the lower mold member from adjacent the parison extrusion head to the molding station at which the upper mold member and the lower mold support member are located. In accordance with a further aspect of the invention, the lower mold member, is a relatively lightweight structure, so that it may be efficiently moved by the robot arm. The usual structural requirements of a blow molding mold are then provided by the upper mold member and the lower support member.

In a further aspect of the invention, the lower mold member and the lower support member have co-operating alignment means to align the lower mold member and the lower support member.

In a further aspect of the invention, the invention comprises a method for blow molding a plastic article. The method includes the steps of providing a mold assembly in which there is an upper mold member having an upper molding cavity, a lower support member, and a lower mold member having a lower mold cavity. The lower mold cavity is shaped to cooperate with the upper molding cavity and the lower mold member is matingly receivable in the lower support member. The method also includes the step of extruding a parison from an extrusion head. Additionally, the method includes moving the lower mold member beneath the extrusion head as the parison is extruded so that the parison is received in the lower molding cavity. The method further includes the step of translating the lower mold member and the parison to adjacent the lower support member and positioning the lower molding member in the lower support member. The mold assembly is then closed by moving the upper mold member toward the lower support member with the lower mold member positioned intermediate the upper mold member and the lower support member. Thereafter the parison is expanded to mold a plastic article.

In a further aspect of the invention, the method includes using a robot to move the lower member beneath the extrusion head and for translating the lower mold member from adjacent the extrusion head to adjacent the lower molding member.

In a further aspect of the invention, the invention includes a multiple station molding system. Each molding station includes a mold assembly in accordance with the aspects of the invention discussed above. The molding system comprises at least one lower mold member and a robot for moving the lower mold member from beneath an extrusion head to adjacent the lower support member in at least one of the molding stations. Advantageously, there are a plurality of lower mold members and the robot can move respective lower mold members to respective molding stations. The molding stations may have similar mold cavities so that each station produces similar plastic parts or alternatively, the stations may have different mold configurations so that different parts can be made in the respective molding stations. Depending upon the molding time for the particular part the same robot may be able to service several molding stations.

In accordance with a further aspect of the invention, the robot may also be used to translate the lower mold member to a cooling station where the lower mold member is cooled by either a gas or a liquid.

BRIEF DESCRIPTION OF THE DRAWINGS

For a better understanding of the present invention, and to show more clearly how it may be carried into effect, reference will now be made by way of example to the accompanying drawings.

The drawings show a preferred embodiment of the present invention, in which.

DETAILED DESCRIPTION OF THE INVENTION

Figure 1A:
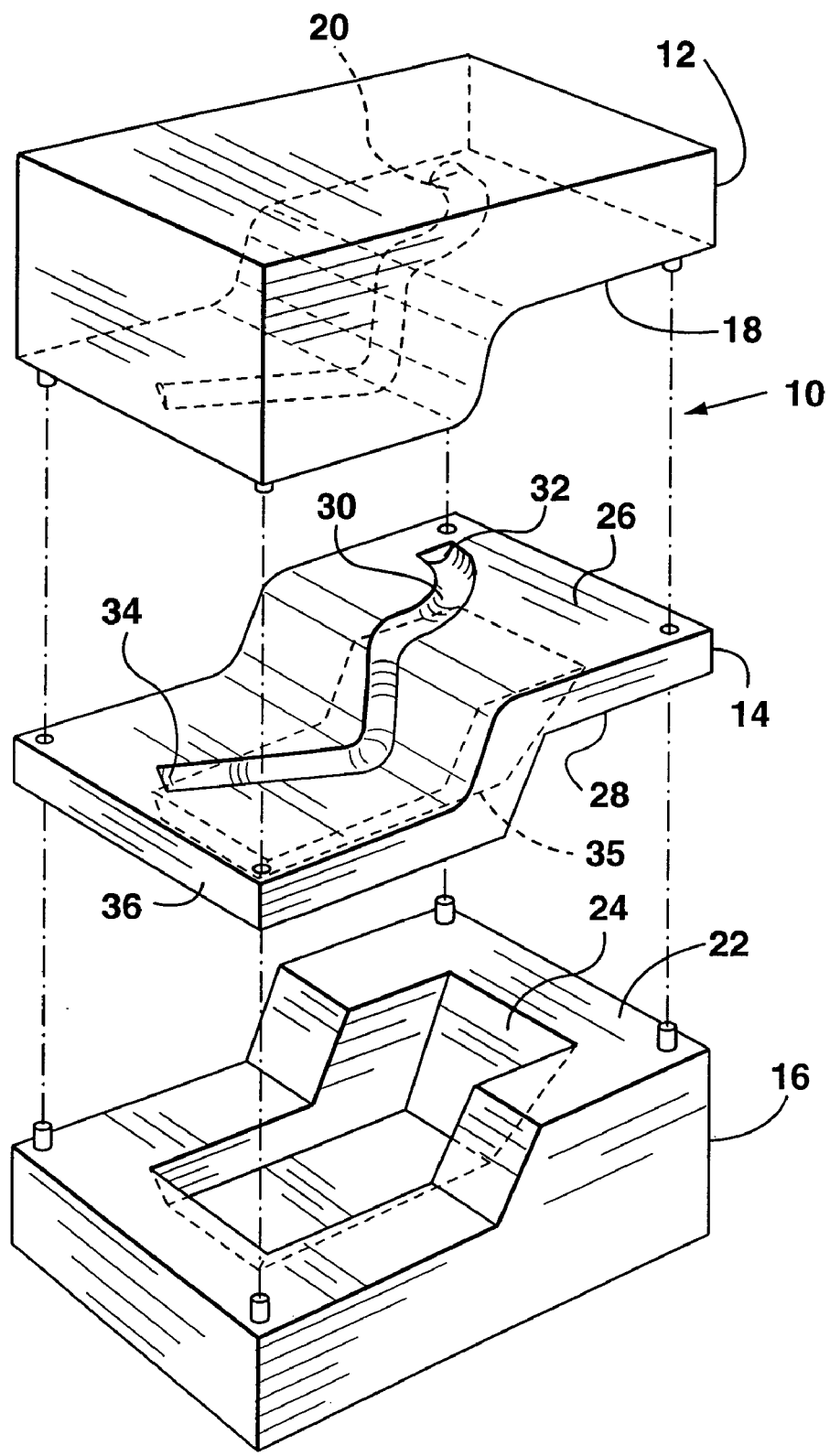
FIG. 1A is an exploded perspective side view of the mold assembly of the present invention.
Figure 1B:
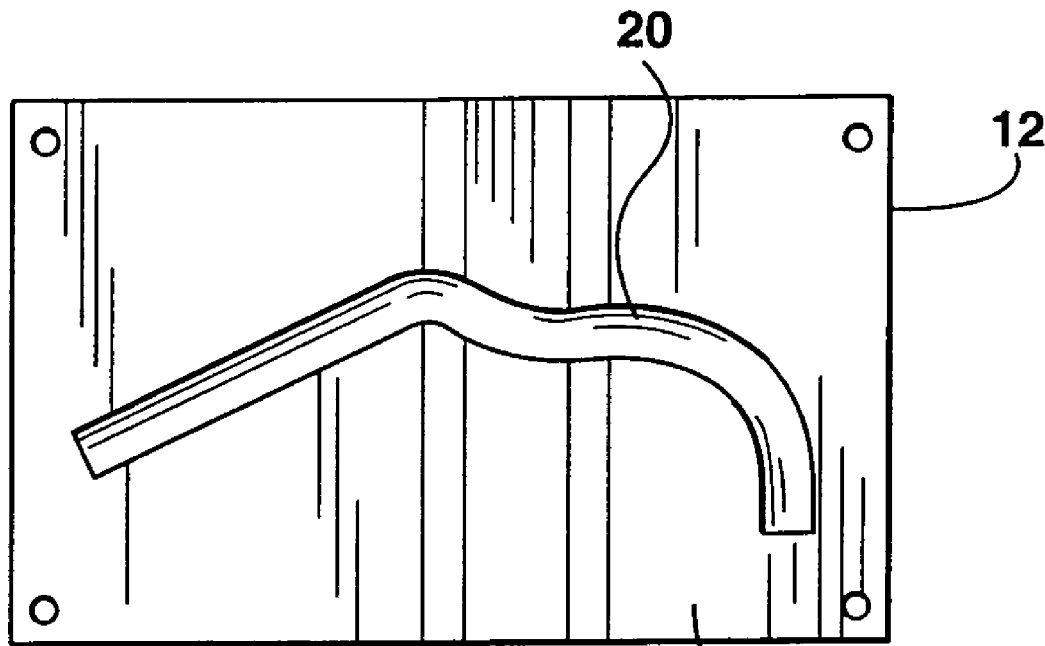
FIG. 1B shows the bottom face of one component of the assembly of FIG. 1A.

Referring now to FIG. 1A, a mold assembly in accordance with the present invention is shown generally at 10. Mold assembly 10 comprises an upper mold member, or mold half, 12, a lower mold member 14, and a lower support member 16. Upper mold member 12 has an engagement surface 18 and an upper molding cavity 20. In use the mold half 12 and mold components 14 and 16 will be generally parallel. The lower surface of mold member 12 is illustrated in FIG. 1B.

Figure 1C:
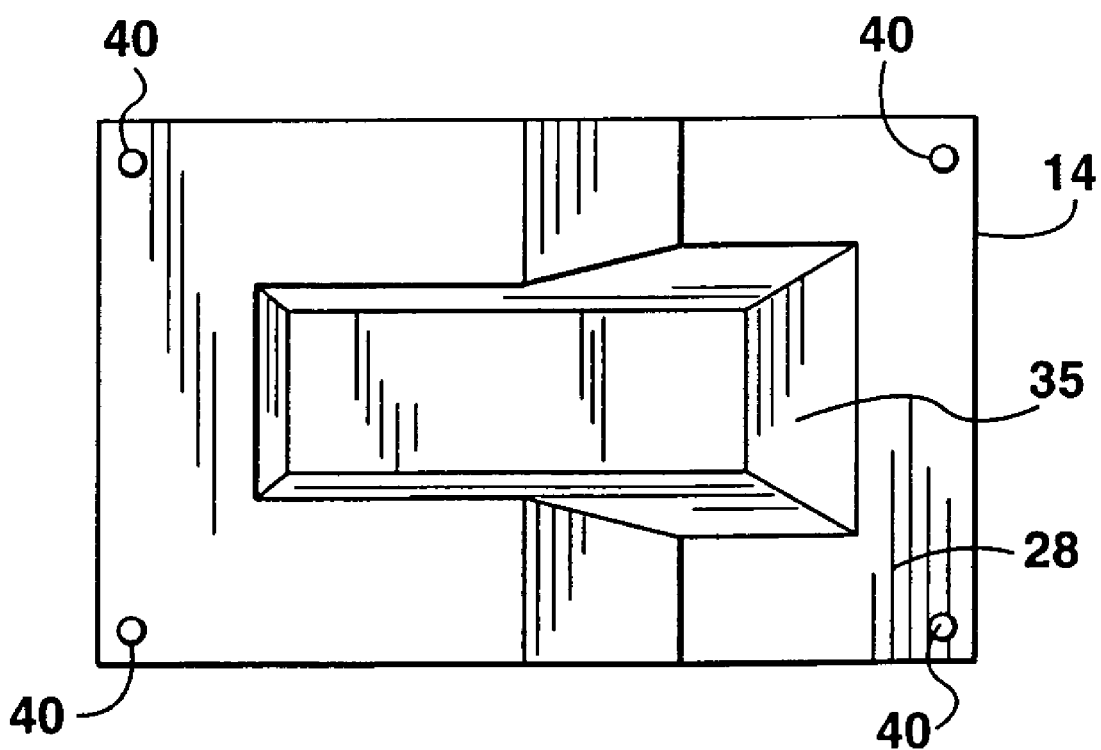
FIG. 1C shows the bottom face of another component of the assembly of FIG. 1A.

Lower mold member 14 has upper and lower engagement surfaces 26 and 28, and a lower molding cavity 30 having ends 32 and 34 and is made from a relatively thin lightweight plate 36 of suitable configuration. The lower surface 28 is shown in FIG. 1C. Lower mold member 14 may have any of several possible configurations, but preferably comprises a molding plate, having a thickness much smaller than its length and width. The underside of lower mold member 14 has a protrusion 35, the shape, size and depth of which, it will be appreciated, is governed in part by the shape, size and depth of cavity 30 and by other factors to be discussed below. The presence of protrusion 35 is necessitated in part by the fact that the depth of the molding cavity will be generally equal to, or greater than, the nominal thickness of plate 36. The plate 36 may be generally planar when used to make a relatively simple article However, the lower mold member 14 and the support member 16 are not necessarily planar in shape and may be far from planar when making articles with significant multi-axial components such as article A shown in FIG. 7. The embodiment shown in FIGS. 1 to 6 is suitable for use in making the multi-axial article of FIG. 7.

Lower support member 16 has an engagement surface 22 and a support cavity 24. Support cavity 24 is provided to support lower mold member 14 during the molding operation to prevent member 14 from deflecting or deforming under molding heat and pressure. As one skilled in the art will appreciate, to best achieve this purpose support cavity 24 will preferably matingly match the shape of the protrusion 35.

Figure 2:
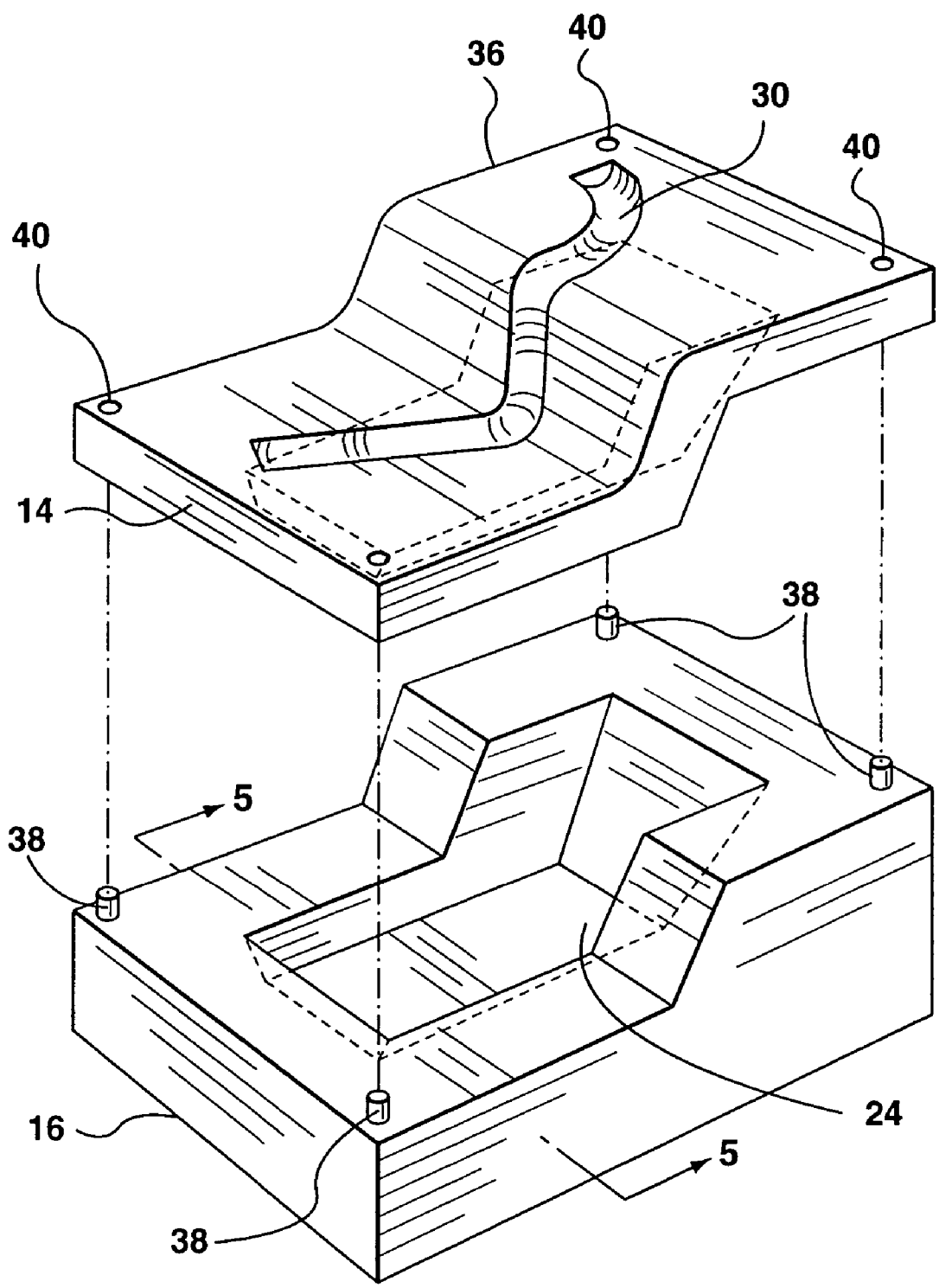
FIG. 2 is an enlarged perspective view of a portion of the mold assembly of FIG. 1.

Referring to FIG. 2, lower support member 16 has a plurality of aligning pins 38. Correspondingly, lower mold member 14 has a plurality of aligning holes 40. Aligning pins 38 and holes 40 are provided to aid alignment of lower mold member 14 in lower support member 16. Such alignment is necessary to ensure that lower mold member 14 is properly seated in lower support member 16, so that upper cavity 20 and lower cavity 30 properly align when mold assembly 10 is closed, as will be described in more detail below. As will be apparent to one skilled in the art, the alignment means disclosed herein is only one of a number of alignment means which may be employed to align members 14 and 16.

Figure 3:
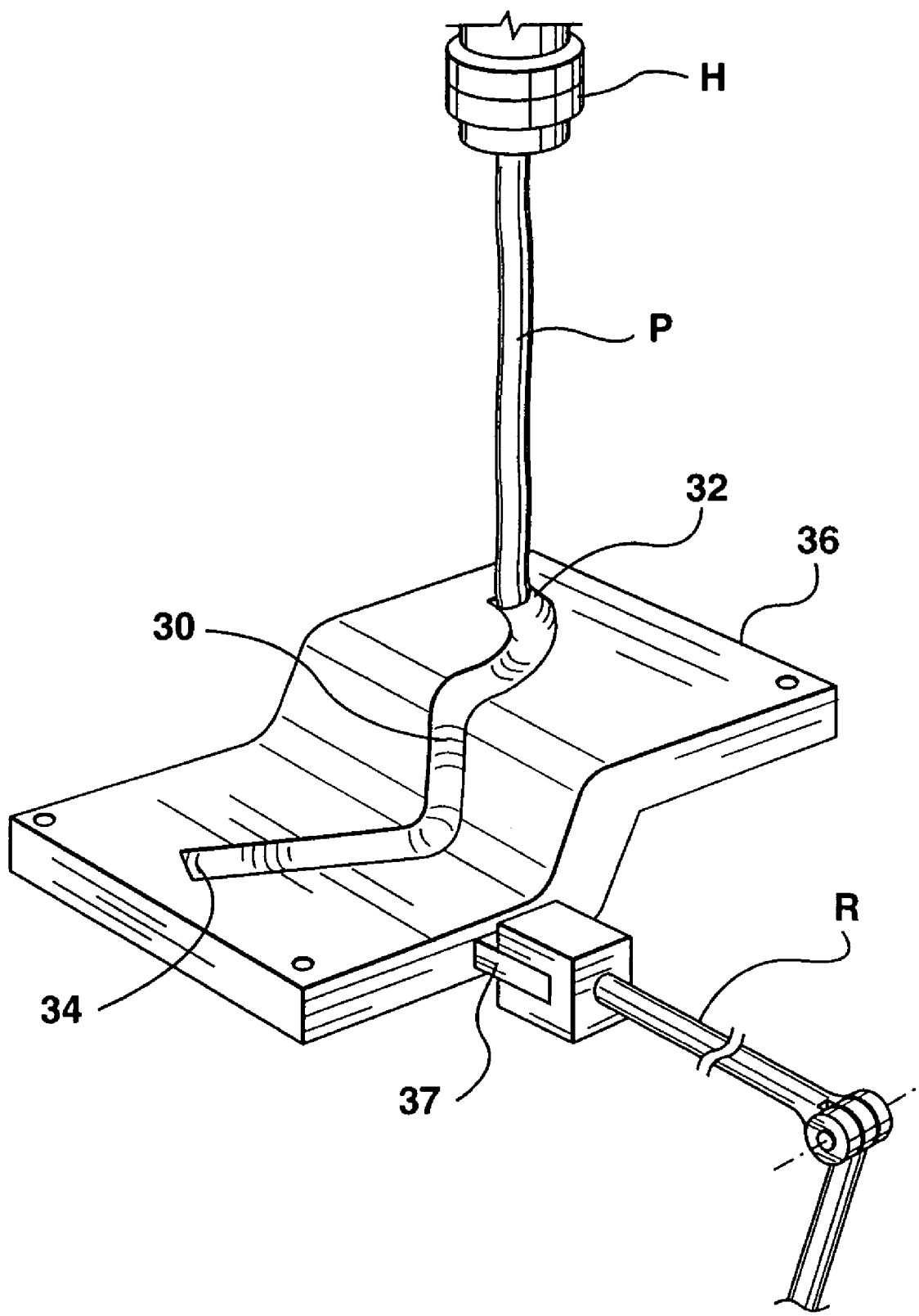
FIG. 3 is a perspective side view of one of the components of the mold assembly of FIG. 1, positioned under a parison extruding head.

Referring to FIG. 3, mold assembly 10 is used in conjunction with a typical extrusion head H which is capable of extruding a molten parison of a type suitable for use in blow molding plastic parts. A manipulator, in this case a robotically-operated arm R is provided to move lower mold member 14 beneath extrusion head H, as will be described below, so that a molten parison P may be positioned in cavity 32 of lower mold member 14. The robotic arm P grasps the lower member by grasping handle 37. The structure by which arm R grasps lower mold member 14 is not limited to a handle and any convenient structure may be used in the present invention. Also manipulation means other than the specific robot arm R illustrated can be used for moving lower mold member 14.

Figure 7:
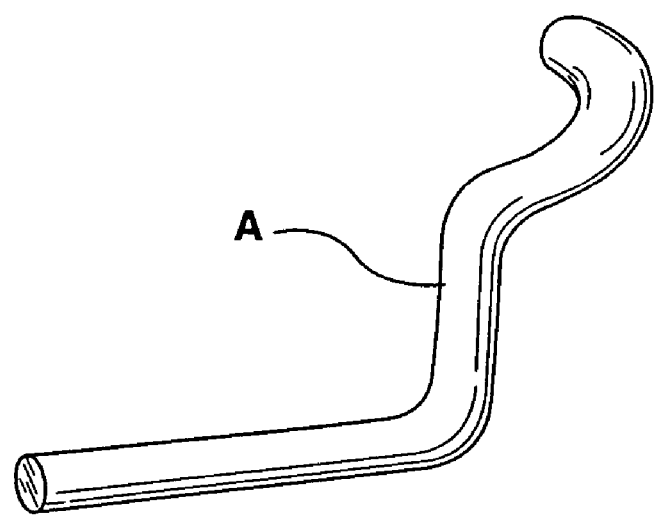
FIG. 7 illustrates a multi-axial part which may advantageously be blow molded using the method and apparatus of the present invention.

In use, lower support member 16 and upper mold member 12 are preferably positioned remote from extrusion head H at a molding station which may include a typical mold clamp or press. Robotic arm R aligns an empty lower mold member 14 generally beneath extrusion head H, and positions member 14 with end 32 of lower cavity 30 directly under head H. As extrusion head H begins to extrude molten parison P, arm R moves member 14, at all times keeping head H directly above lower cavity 30, so that parison P is deposited sequentially and alignedly within lower molding cavity 30. Such movement of member 14 may be in two (i.e. x and y) or three (i.e. x, y and z) directions, and will be governed by the shape of cavity 30, as will be apparent to one skilled in the art. Advantageously, when a parison for a multi-axial article such as Article A of FIG. 7 is being extruded, the member 14 may be moved vertically (i.e. in the z direction) so that the distance between the extruder nozzle and the surface of the cavity 30 is minimized to the extent possible bearing in mind the shape of member 14. This in turn minimizes the weight of molten parison extending between the extrusion head and the member 14 to be supported. This in turn will allow for the use of plastic materials having lower hot melt strength.

Figure 4:
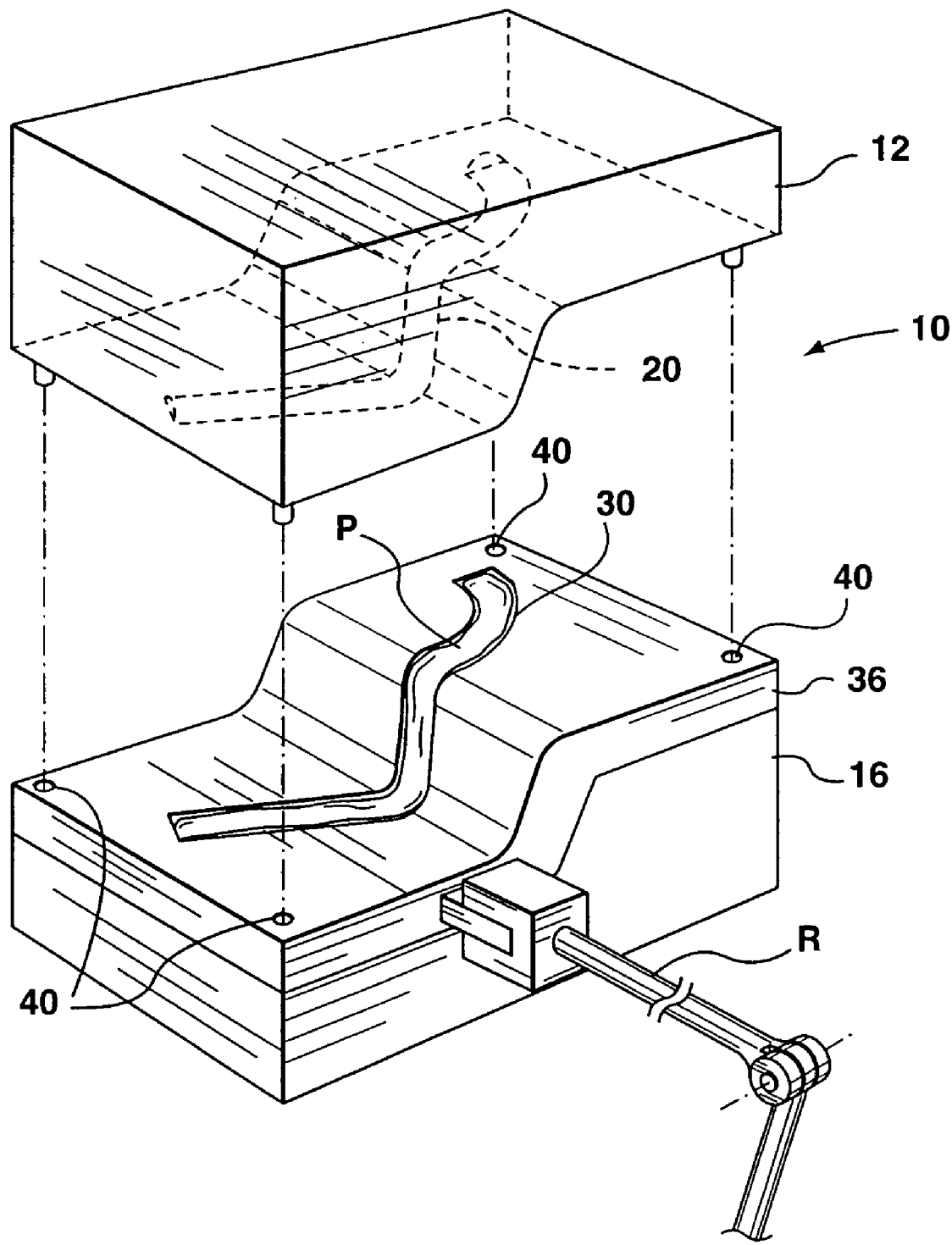
FIG. 4 is a perspective side view of the mold assembly of FIG. 1, shown with a molten parison disposed therein prior to molding.

When parison P reaches end 34 in cavity 30, a cutter on head H severs parison P, such that parison P terminates within, and substantially fills, molding cavity 30. With parison P now positioned in lower cavity 30, mold member 14 is transported by robotic arm R away from extrusion head H to a position over lower support member 16. This movement of lower mold member 14 with the parison P in cavity 30 may be in any direction vertically or horizontally. Referring to FIG. 4, robotic arm R positions and deposits mold member 30 in lower support member 16 with protrusion 35 in cavity 24, and the alignment therein is made by mating alignment pins 38 and holes 40. When mold member 14 is disposed within lower support member 16, engagement surfaces 28 and 22 are substantially in contact with one another. Once it has deposited mold member 14 in lower support member 16, robotic arm R may either remain in contact with member 14, or it may preferably disengage, as may desired in the particular molding operation in which the present invention is utilized.

Figure 5:
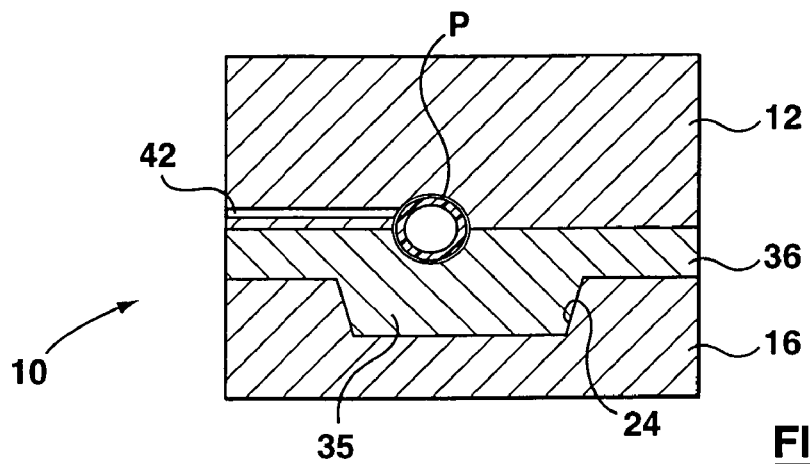
FIG. 5 is a cross-sectional side view of the mold assembly of FIG. 1 in the closed position.

With lower mold member 14 positioned within lower support member 16 the combination of member 14 and member 16 together comprise a lower mold half for blow molding purposes. To prepare for blow molding, upper mold member 12 is closed against lower molding member 14 by means of a typical molding press thereby closing mold assembly 10 as shown in FIG. 5. Upper molding member 12 may be so moved by any means known in the art such as a clamp or molding press. When mold assembly 10 is closed, engagement surfaces 18 and 26 are substantially in contact with one another. These surfaces are similar to parting surfaces in typical mold halves. Upper molding cavity 20 substantially aligns with lower molding cavity 30, with parison P disposed therein. A blow pin (not shown) may then be inserted through a port 42 to admit a blowing gas under pressure to parison P. The configuration of port 42 and the pressurization of parison P are as is known in the art and need not be further described herein.

Figure 6:
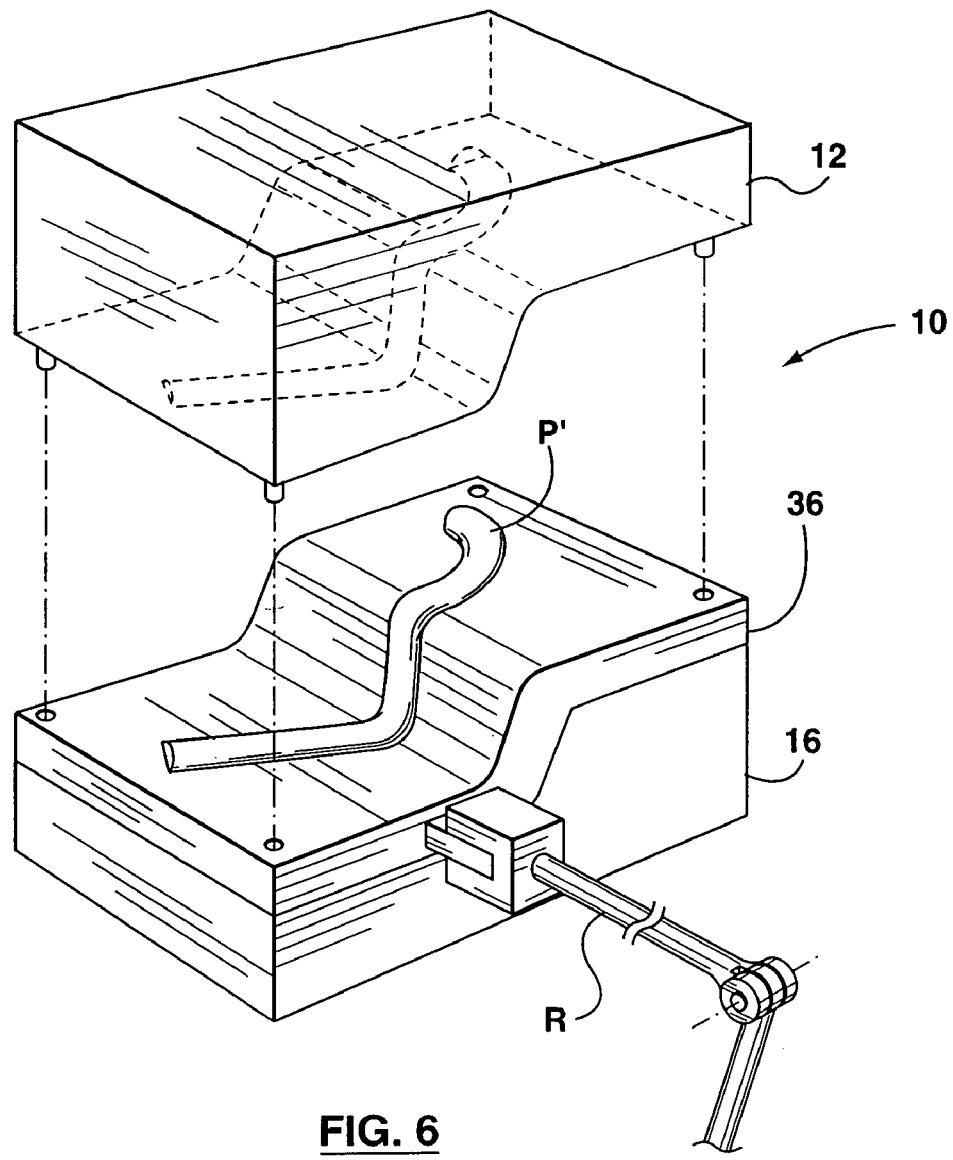
FIG. 6 is a perspective side view of the mold assembly of FIG. 1, shown with a plastic part disposed therein after molding.

Referring to FIG. 6, once parison P has been expanded and the plastic part P' is formed and cooled sufficiently to be removed from mold assembly 10, mold assembly 10 is opened. Robotic arm R then removes mold member 14 from lower support member 16. Plastic part P' may be removed from mold member 14 either prior to, or after, removal of member 14 from lower support member 16. If part P' is removed after member 14 has been removed from member 16, part P' may be ejected from member 14 by simply tilting or inverting member 14. Regardless of the method used, however, after part P' is removed, mold member 14 may then be transported back to the start position adjacent extrusion head H for subsequent reloading to repeat the molding process for the next part.

Alternative cooling means may be utilized for mold member 14. Member 14 may be air cooled during translation from the molding station to adjacent the extruder H. If desirable, member 14 may be provided with channels for passage of cooling fluid, if desired. Flow of cooling fluid may occur while member 14 is in contact with support member 16 or at other convenient times in the mold cycle. If desired, the robot arm R could even move the member 14 to be quenched in a liquid bath.

Upper molding member 12 and lower support member 16 may be cooled by any means known in the art. During the molding process lower molding member 14 will be in surface contact with upper molding member 12 and lower support member 16. There may be sufficient thermal transfer to those two components that member 14 does not require additional cooling means.

Figure 8:
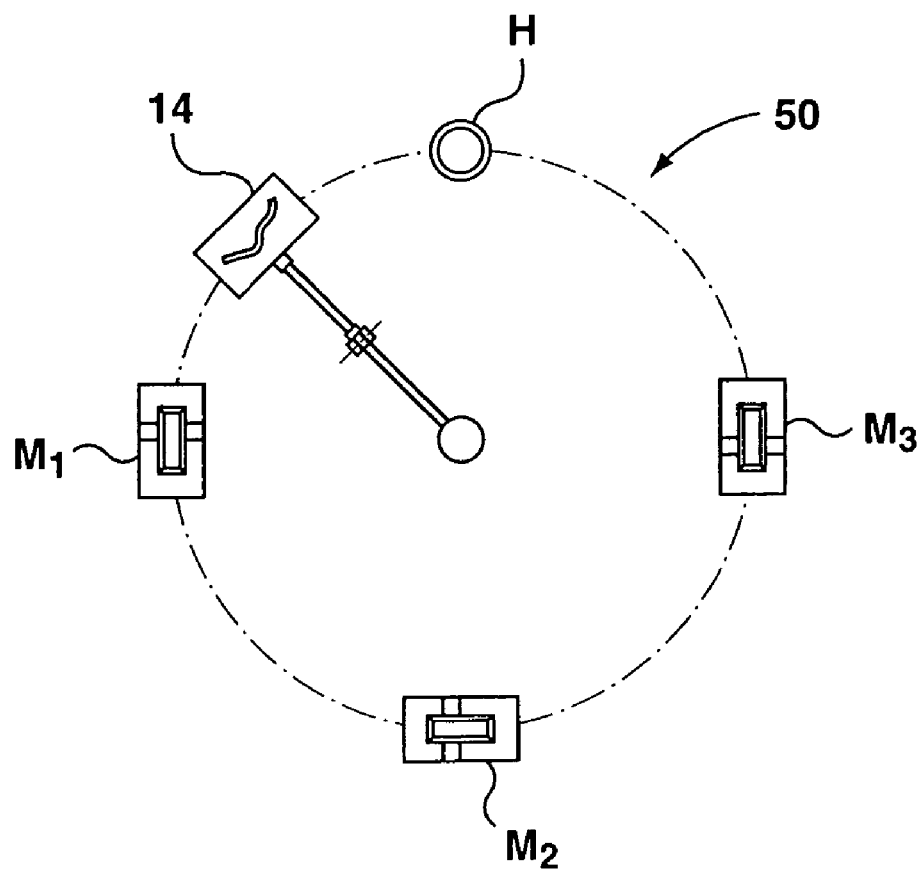
FIG. 8 illustrates a multi-station system using the embodiment of FIGS. 1-6.

As will be apparent to one skilled in the art, the relatively simple construction of mold member 14 advantageously allows the process of the present invention to be utilized in a molding system having a plurality of molding stations in conjunction with a single extrusion head H. This system 50 is shown diagrammatically in FIG. 8. In FIG. 8 which is a plan view, the extruder head is shown as H. The robotic arm R is positioned adjacent the head H and adjacent molding stations M1, M2 and M3 will include an upper molding member 12 and a support member 16 and the usual press and cooling equipment. One lower molding member 14 is shown within the grasp of robotic arm R being transferred toward station M1. Other lower molding members 14 are already at stations M2 and M3 where the molding process is just ending and beginning respectively.

Also, it may be advantageous to use a plurality of mold members 14 and a single press within an upper molding member 12 and lower support member 16. The utilization of a plurality of mold members 14 permits successive mold members 14 to be, at a given instant in the process: (i) positioned under extrusion head H and receiving a parison P; and (ii) positioned in molding assembly 10 between upper molding member 12 and lower support member 16 while blow molding is performed.

The present invention provides a novel apparatus and method having several advantages over known blow molding plastic techniques. The use of a relatively light weight lower mold member 14 allows the benefits of robotic manipulation of a simplified mold member beneath an extrusion head without the necessity of moving the entire mold half and support structure. Furthermore, manipulating structure which includes the final mold cavity portion beneath the extrusion head, rather than a pre-mold, eliminates the need for transferring of the molten parison between a pre-mold and the final mold. A further advantage is provided in that lower mold member 14 of the present invention may be cooled by simple immersion in a cooling pool or the like, thereby providing the opportunity to eliminate the need for the more complex methods of cooling molds which are known in the art. Also, as described above, the simple construction of lower mold member 14 permits a plurality of such members to be used, cost-effectively, in a commercial multi press molding operation while using a robot arm to serve several molding stations from a single extrusion head.

While the above description constitutes the preferred embodiment, it will be appreciated that the present invention is susceptible to modification and change without departing from the fair meaning of the proper scope of the accompanying claims.

The invention claimed is:

1. A mold assembly for blow molding a plastic article comprising:
   (a) an upper mold member having an upper molding cavity;
   (b) a lower support member; and
   (c) a lower mold member having a lower molding cavity, said lower molding cavity being shaped to co-operate with said upper molding cavity, said lower mold member having means for being matingly receivable in and supportable by said lower support member, said lower mold member being moveable from a position adjacent a parison extrusion head for receiving a parison in said lower molding cavity to a position where said lower member is received in said lower support member, and said mold assembly is closeable with said lower mold member positioned intermediate said upper mold member and said lower support member, said mold assembly, when closed, being capable of expanding said parison disposed within said mold assembly.

2. The mold assembly of claim 1 wherein said lower mold member comprises a substantially planar plate member.

3. The mold assembly of claim 1 wherein said lower molding cavity is centrally located in said lower mold member.

4. The mold assembly of claim 1 wherein said lower mold member is moveable by robotic means.

5. The mold assembly of claim 1 wherein said upper mold member and said lower support member are positionable remote from said extrusion head and said lower mold member is transportable between said extrusion head and said lower support member.

6. The mold assembly of claim 1 wherein said lower mold member and said lower support member have co-operating alignment means to align said lower mold member and said lower support member.

7. A molding system for blow molding plastic articles comprising a robotic arm, at least one extrusion head for extruding a parison of thermoplastic material suitable for use in blow molding, and a plurality of molding stations,
   each said molding station comprising an upper mold member having an upper molding cavity and a lower support member,
   said system further including at least one lower mold member having a lower molding cavity, said lower molding cavity being shaped to cooperate with said upper molding cavities, said lower mold member having means for being matably receivable in and supportable by said lower support member of each said molding station, said robotic arm being capable of moving said lower mold member between a position adjacent said extrusion head for receiving said parison in said lower molding cavity, to a position where said lower molding member is receivable in a lower support member of each said molding stations,
   and each said molding station is closable with said lower mold member positioned intermediate said upper mold member and said lower support member of said station, said molding station when closed, being capable of expanding said parison disposed within said mold assembly.

8. The molding system of claim 7 comprising a plurality of lower molding members.

9. The molding system of claim 8 wherein the shape of the molding cavity at each of said plurality of stations is the same.

10. The molding system of claim 8 wherein the shape of the molding cavity at each of said plurality of stations is different.

* * * * *